(12) United States Patent
Ichikawa et al.

(10) Patent No.: US 9,360,183 B2
(45) Date of Patent: Jun. 7, 2016

(54) MIRROR APPARATUS FOR A VEHICLE

(71) Applicants: KABUSHIKI KAISHA TOKAI-RIKA-DENKI-SEISAKUSHO, Aichi-ken (JP); TOYOTA JIDOSHA KABUSHIKI KAISHA, Toyota-shi, Aichi-ken (JP)

(72) Inventors: Tomonori Ichikawa, Aichi-ken (JP); Toshinari Nakai, Aichi-ken (JP); Yasunori Hirosawa, Okazaki (JP)

(73) Assignees: KABUSHIKI KAISHA TOKAI-RIKA-DENKI-SEISAKUSHO, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/341,122

(22) Filed: Jul. 25, 2014

(65) Prior Publication Data

US 2015/0036371 A1 Feb. 5, 2015

(30) Foreign Application Priority Data

Jul. 30, 2013 (JP) ................................ 2013-158107

(51) Int. Cl.
*F21S 8/10* (2006.01)
*B60Q 1/26* (2006.01)
(Continued)

(52) U.S. Cl.
CPC ........... *F21S 48/2243* (2013.01); *B60Q 1/2665* (2013.01); *B60Q 1/323* (2013.01);
(Continued)

(58) Field of Classification Search
CPC ... F21S 48/2243; F21S 48/2287; F21S 48/24; F21S 48/215; F21S 48/2212; F21S 48/2262; B60R 1/1207; B60R 1/06; B60Q 1/2665; B60Q 9/008; B60Q 1/323
See application file for complete search history.

(56) References Cited

U.S. PATENT DOCUMENTS

| 6,789,929 B1 * | 9/2004 | Doong ................. B60Q 1/0052 362/23.16 |
| 7,241,037 B2 * | 7/2007 | Mathieu ............... B60R 1/1207 340/475 |

(Continued)

FOREIGN PATENT DOCUMENTS

| JP | 2006164908 A | 6/2006 |
| JP | 2009096389 A | 5/2009 |

(Continued)

OTHER PUBLICATIONS

Japanese Office Action application No. 2013-158107 dated Jun. 30, 2015.
Japanese Office Action for application No. 2013-158107 dated Nov. 17, 2015 and English translation.

*Primary Examiner* — Joseph L Williams
(74) *Attorney, Agent, or Firm* — Roberts Mlotkowski Safran & Cole, PC

(57) ABSTRACT

A mirror apparatus for a vehicle includes a design body, a first emission member, a second emission member, a guide body and a differentiation portion. The design body includes a mirror provided at a vehicle, and the design body structures a design surface. The first emission member emits light and the second emission member emits light. The guide body guides the light emitted by the first emission member and the light emitted by the second emission member to an outer side of the design body. The differentiation portion makes directions in which the light emitted by the first emission member and the light emitted by the second emission member are guided by the guide body different.

10 Claims, 5 Drawing Sheets

(51) Int. Cl.
   *B60Q 1/32* (2006.01)
   *B60Q 9/00* (2006.01)
   *B60R 1/06* (2006.01)
   *B60R 1/12* (2006.01)

(52) U.S. Cl.
   CPC ............... *B60Q 9/008* (2013.01); *B60R 1/06* (2013.01); *B60R 1/1207* (2013.01); *F21S 48/211* (2013.01); *F21S 48/215* (2013.01); *F21S 48/2212* (2013.01); *F21S 48/2262* (2013.01); *F21S 48/2287* (2013.01); *F21S 48/24* (2013.01)

(56) References Cited

U.S. PATENT DOCUMENTS

| 2006/0164839 | A1* | 7/2006 | Stefanov | F21S 48/215 362/327 |
| 2006/0234612 | A1* | 10/2006 | Gotthardt | B60Q 1/0683 452/58 |
| 2014/0177249 | A1* | 6/2014 | Iseki | B60Q 1/2665 362/511 |

FOREIGN PATENT DOCUMENTS

| JP | 4413764 B2 * | 2/2010 | ........... B60Q 1/2665 |
| JP | 2013063681 | 4/2013 | |

* cited by examiner

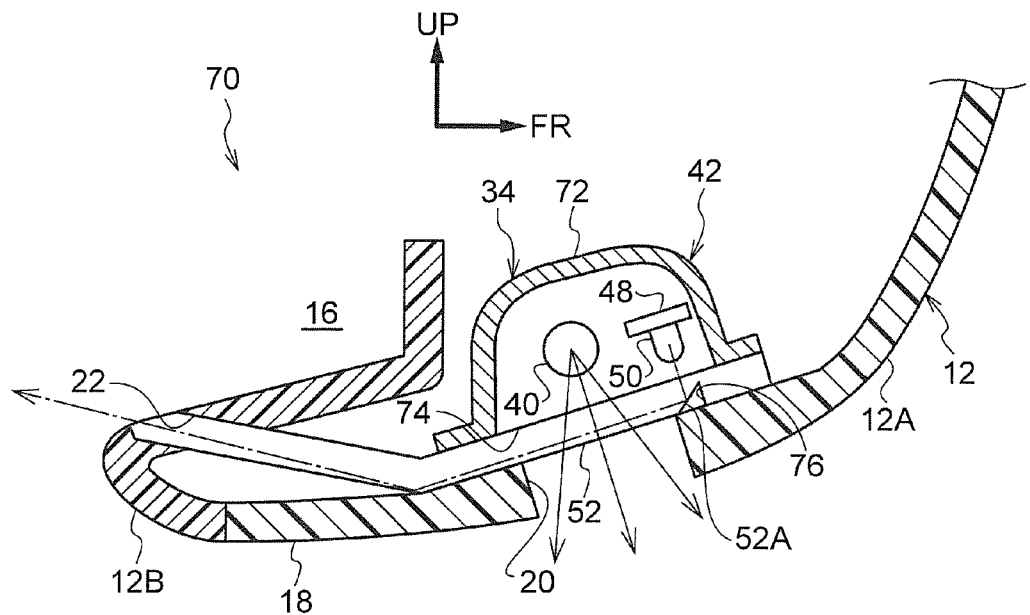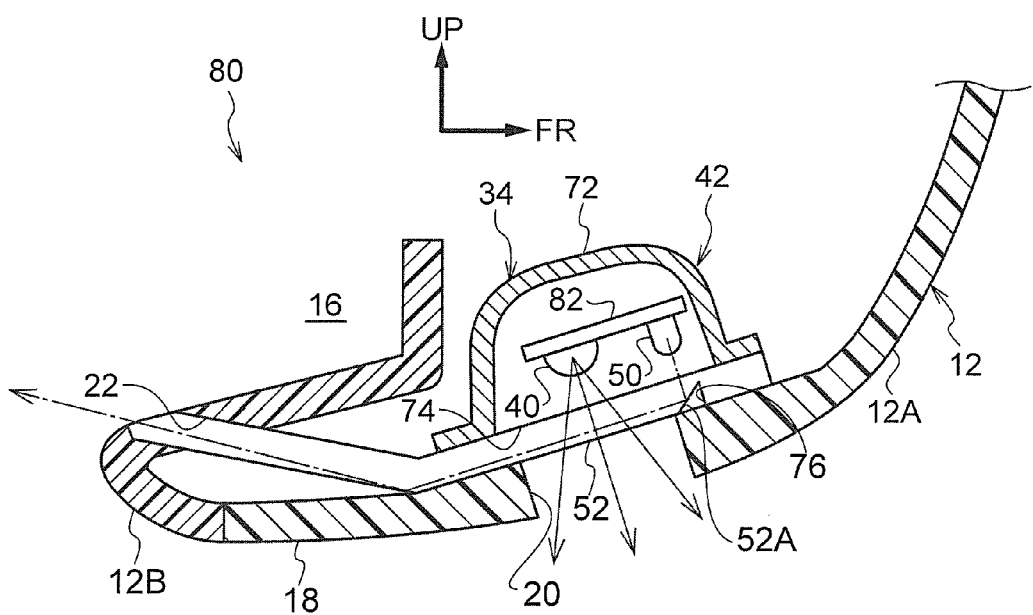

MIRROR APPARATUS FOR A VEHICLE

CROSS-REFERENCE TO RELATED APPLICATION

This application claims priority under 35 USC 119 from Japanese Patent Application No. 2013-158107 filed Jul. 30, 2013, the disclosure of which is incorporated by reference herein.

BACKGROUND

1. Technical Field

The present invention relates to a mirror apparatus for a vehicle, in which a guide body guides lights to the outer side of a design body.

2. Related Art

In a vehicle door mirror device recited in Japanese Patent Application Laid-Open (JP-A) No. 2013-063681, a light guide plate guides light from a light source to a window portion of a mirror housing.

However, in this vehicle door mirror device, if the light source and the window portion of the mirror housing are each plurally provided, it is necessary to provide separate corresponding light guide plates for the respective light sources and mirror housing window portions. Thus, a space required for mounting the light guide plates becomes larger.

SUMMARY

In consideration of the circumstances described above, the present invention provides a mirror apparatus for a vehicle that may make a space for mounting of a guide body smaller.

A mirror apparatus for a vehicle according to a first aspect of the present invention includes: a design body that includes a mirror provided at a vehicle, the design body structuring a design surface; a first emission member that emits light; a second emission member that emits light; a guide body that guides light emitted by the first emission member and light emitted by the second emission member to an outer side of the design body; and a differentiation portion that makes directions in which the light emitted by the first emission member and the light emitted by the second emission member are guided by the guide body different.

In the mirror apparatus for a vehicle according to the first aspect of the present invention, the design body is structured to include the mirror provided at the vehicle, and the design member structures the design surface. The light emitted by the first emission member and the light emitted by the second emission member are guided by the guide body to the outer side of the design body.

Directions of guiding by the guide body of the light emitted by the first emission member and the light emitted by the second emission member are made different by the differentiation portion. As a result, the need to provide separate guide members corresponding to the first emission member and the second emission member may be eliminated, and a space for mounting of the guide body may be made smaller.

In a mirror apparatus for a vehicle according to a second aspect of the present invention, in the mirror apparatus for a vehicle according to the first aspect, the guide body guides the light emitted by the first emission member substantially in a plate thickness direction, and guides the light emitted by the second emission member substantially in a plate surface direction.

In the mirror apparatus for a vehicle according to the second aspect of the present invention, the guide body guides the light emitted by the first emission member substantially in the plate thickness direction, and the guide body guides the light emitted by the second emission member substantially in the plate surface direction. Thus, the directions in which the light emitted by the first emission member and the light emitted by the second emission member are guided by the guide body may be made greatly different.

In a mirror apparatus for a vehicle according to a third aspect of the present invention, in the mirror apparatus for a vehicle according to the first aspect, the differentiation portion reflects the light emitted by one of the first emission member or the second emission member.

In the mirror apparatus for a vehicle according to the third aspect of the present invention, the differentiation portion reflects the light emitted by the first emission member or the second emission member. Thus, the differentiation portion may make the directions in which the light emitted by the first emission member and the light emitted by the second emission member are guided by the guide body different with a simple structure.

In a mirror apparatus for a vehicle according to a fourth aspect of the present invention, in the mirror apparatus for a vehicle according to the first aspect, a dividing body is provided disposed between the first emission member and the second emission member, the dividing body dividing apart incidence regions into the guide body of the light emitted by the first emission member and the light emitted by the second emission member.

In the mirror apparatus for a vehicle according to the fourth aspect of the present invention, the dividing body is provided between the first emission member and the second emission member, and the dividing body separates incidence regions into the guide body of the light emitted by the first emission member and the light emitted by the second emission member. Thus, the differentiation portion may make the directions in which the light emitted by the first emission member and the light emitted by the second emission member are guided by the guide body different effectively.

In a mirror apparatus for a vehicle according to a fifth aspect of the present invention, in the mirror apparatus for a vehicle according to the first aspect, the guide body includes a plate-form lens, and the differentiation portion includes a redirection surface that is formed at an end portion of the lens, and the light emitted by the second emission member being reflected by the redirection surface to be guided in a plate surface direction.

In a mirror apparatus for a vehicle according to a sixth aspect of the present invention, in the mirror apparatus for a vehicle according to the first aspect, the guide body includes a plate-form lens, and the differentiation portion includes a redirection surface that is formed at an indentation portion of the lens, the indentation portion being formed with a triangular shape in cross section, and the light emitted by the second emission member being reflected by the redirection surface to be guided in a plate surface direction.

In a mirror apparatus for a vehicle according to a seventh aspect of the present invention, in the mirror apparatus for a vehicle according to the first aspect, it is provided with a support member that supports the first emission member and the second emission member; and a casing body that fixes the support member inside the casing body.

In a mirror apparatus for a vehicle according to an eighth aspect of the present invention, in the mirror apparatus for a vehicle according to the seventh aspect, a first reflection surface is formed in a curved face-form at an inner face of the casing body, and the light emitted by the first emission member is reflected by the first reflection surface.

In a mirror apparatus for a vehicle according to a ninth aspect of the present invention, in the mirror apparatus for a vehicle according to the seventh aspect, a second reflection surface is formed in a flat face-form at an inner face of the casing body, and the light emitted by the second emission member is reflected by the second reflection surface.

BRIEF DESCRIPTION OF THE DRAWINGS

Exemplary Embodiments of the present invention will be described in detail based on the following figures, wherein:

FIG. 3A is a sectional diagram, viewed in the vehicle width direction, showing principal portions of a door mirror apparatus for a vehicle in accordance with a second exemplary embodiment of the present invention.

FIG. 3B is a sectional diagram, viewed in the vehicle width direction, showing principal portions of a door mirror apparatus for a vehicle in accordance with a third exemplary embodiment of the present invention.

DETAILED DESCRIPTION

First Exemplary Embodiment

Figure 1:
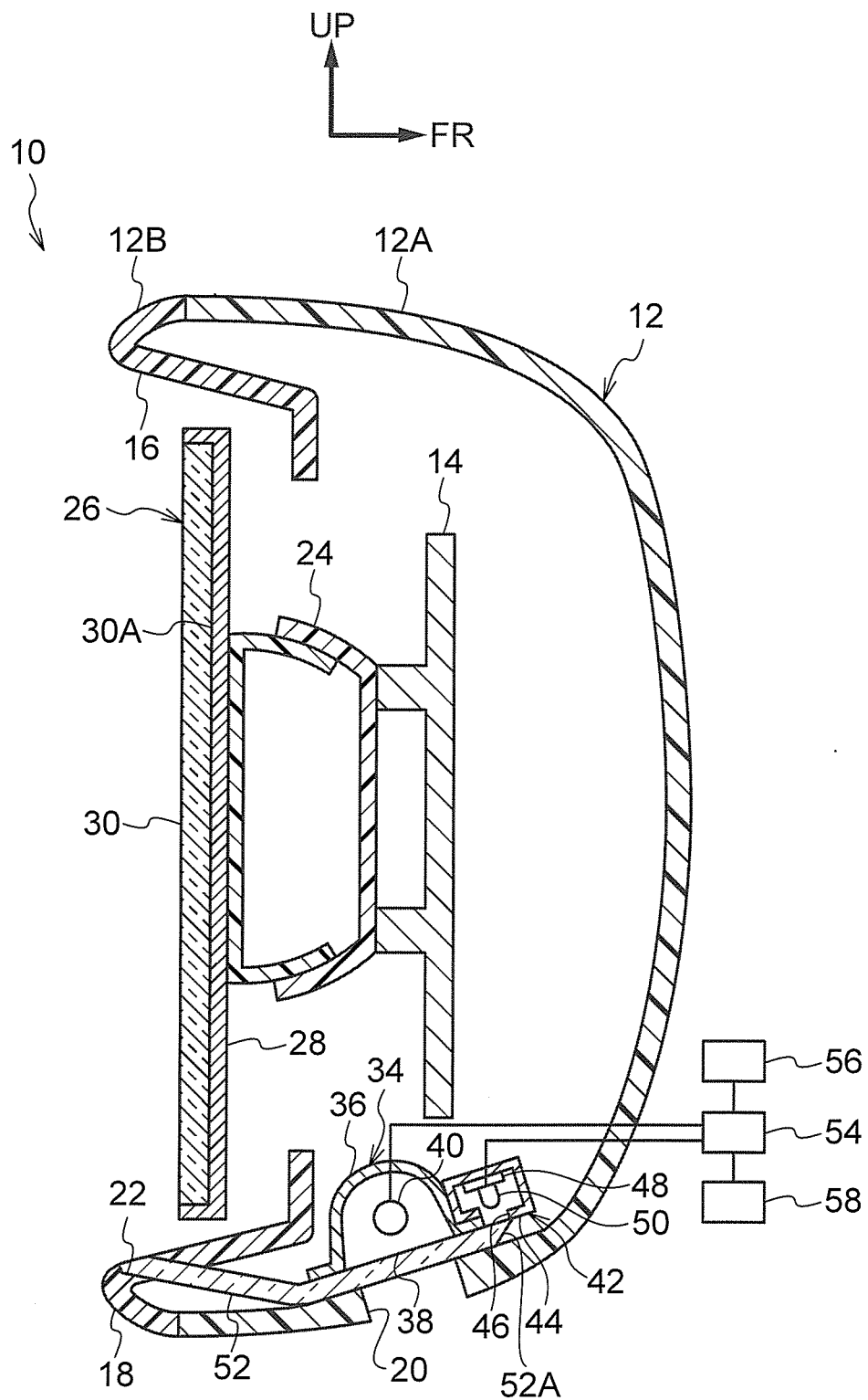
FIG. 1 is a sectional diagram, viewed in a vehicle width direction, showing a door mirror apparatus for a vehicle in accordance with a first exemplary embodiment of the present invention.

FIG. 1 is a sectional diagram in which a vehicle door mirror apparatus 10 in accordance with a first exemplary embodiment, in which the door mirror apparatus for a vehicle of the present invention is employed, is viewed in a vehicle width direction. In the drawings, a vehicle forward direction is indicated by the arrow FR and an upward direction is indicated by the arrow UP.

The vehicle door mirror apparatus 10 according to the present exemplary embodiment is provided with a stay (not shown in the drawings) that serves as a mounting member structuring a design body. The stay is fixed at the vehicle forward side end of an up-and-down direction middle portion of a door of the vehicle (a front side door, at the vehicle body side). Thus, the vehicle door mirror apparatus 10 is disposed at the outer side of the door. The stay also structures a design surface of the vehicle door mirror apparatus 10.

A support body (not shown in the drawings) is supported at the stay. The support body protrudes to the upper side of the stay.

As shown in FIG. 1, a visor 12 in a substantially cuboid container shape is provided at the upper side of the stay. The visor 12 serves as an accommodation member (a cover member) that structures the design body. The support body penetrates through a lower wall at a vehicle width direction inner side end portion of the visor 12. A plate-shaped bracket 14 is fixed inside the visor 12. The bracket 14 serves as a support member (a stiff member). A vehicle width direction inner side end portion of the bracket 14 is supported at the support body. Thus, the stay supports the bracket 14 and the visor 12 via the support body. The visor 12 is structured by a combination of a cover portion 12A at the vehicle front side thereof and a rim portion 12B at the vehicle rear side. Thus, the visor 12 structures the design surface of the vehicle door mirror apparatus 10.

A substantially cuboid accommodation space 16 is formed at a vehicle rear side region of the interior of the visor 12. The accommodation space 16 opens to the vehicle rear side, and opens to the vehicle front side and communicates with the interior of the visor 12. An accommodation frame 18 is formed at a vehicle rear side region of the visor 12. The accommodation frame 18 surrounds the whole periphery of the accommodation space 16. The accommodation frame 18 is formed in a substantial V shape in cross section. The interior of the accommodation frame 18 opens to the vehicle front side and communicates with the interior of the visor 12.

An opening hole 20 that serves as a first emission portion is formed penetrating through a lower wall of the visor 12. The opening hole 20 is disposed in a vicinity of the vehicle front side of the accommodation frame 18, and opens the interior of the visor 12 to the lower side. A light emission hole 22 that serves as a second emission portion is formed penetrating through a lower portion of the visor 12. The light emission hole 22 is provided in a side wall of the accommodation frame 18 at a side thereof at which the accommodation space 16 is disposed (the upper side), and the light emission hole 22 opens the interior of the visor 12 (the interior of the accommodation frame 18) to the vehicle rear side, toward the upper side.

A mirror adjustment device 24 that serves as a moving unit is fixed to the vehicle rear side of the bracket 14 inside the visor 12. The mirror adjustment device 24 protrudes into the accommodation space 16.

A mirror body 26, structuring the design body, is attached to the vehicle rear side of the mirror adjustment device 24. The mirror body 26 is disposed inside the accommodation space 16 of the visor 12, and structures the design surface of the vehicle door mirror apparatus 10. A mirror holder 28 in a substantial plate shape is provided at the mirror body 26. The mirror body 26 is attached to the mirror adjustment device 24 by the mirror holder 28 being attached to the mirror adjustment device 24. The mirror holder 28 retains a mirror 30 with a substantially rectangular flat plate shape. The vehicle front side and the whole of the outer periphery of the mirror 30 are covered by the mirror holder 28. A mirror surface 30A of the mirror 30 faces to the vehicle rear side. Thus, an occupant 32 of the vehicle (specifically a driver; see the eye of the occupant 32 in FIG. 2) may see to the vehicle rear side with the mirror 30.

The mirror adjustment device 24 may be operated electronically or manually. When the mirror adjustment device 24 is operated, the mirror body 26 is tilted (moved). Thus, the angle of the mirror surface 30A of the mirror 30 is adjusted and the range that the occupant 32 can see with the mirror 30 is altered.

Figure 2:
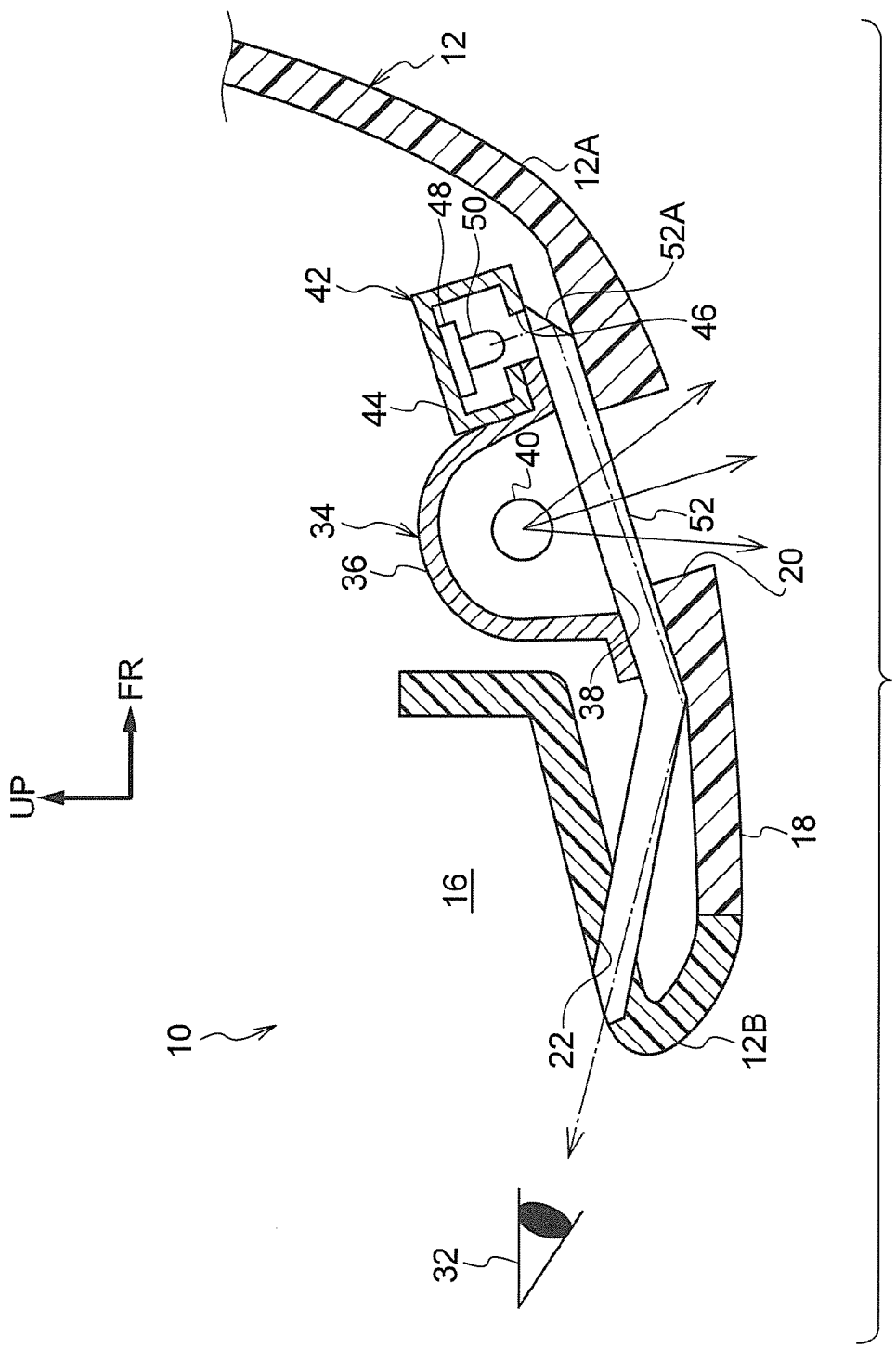
FIG. 2 is a sectional diagram, viewed in the vehicle width direction, showing principal portions of the door mirror apparatus for a vehicle in accordance with the first exemplary embodiment of the present invention.

As is shown in detail in FIG. 2, an illumination lamp 34 (a floor lamp) that serves as a first emission member is fixed at the lower end of the interior of the visor 12. A first casing body 36 with a substantially hemispherical container shape is provided at the illumination lamp 34. The first casing body 36 serves as a reflecting body. An inner face of the first casing body 36 is made capable of reflecting light. A first emission aperture 38 is formed in a lower side face of the first casing body 36. Thus, the lower side face of the first casing body 36 is open. The first emission aperture 38 faces the opening hole 20 of the visor 12.

A first base plate in a flat plate shape (not shown in the drawings) is fixed inside the first casing body 36 to serve as a support member. The first base plate is disposed substantially perpendicularly to the up-and-down direction. A first light source 40 (for example, a lamp) is supported at the lower side of the first base plate. To the lower side thereof, the first light source 40 faces the first emission aperture 38 of the first casing body 36 and the opening hole 20 of the visor 12. When the first light source 40 is lit, light may be mainly emitted to the lower side, and the illumination lamp 34 may emit the light from the first light source 40 through the first emission aperture 38 of the first casing body 36 and toward the opening hole 20 of the visor 12.

An indicator 42 that serves as a second emission member is fixed at the lower end of the interior of the visor 12, at the vehicle forward side relative to the illumination lamp 34. A second casing body 44 in a cuboid container shape is provided at the indicator 42. The second casing body 44 serves as a reflecting body. An inner face of the second casing body 44 is made capable of reflecting light. A second emission aperture 46 is formed penetrating through a lower wall of the second casing body 44. The second emission aperture 46 faces a region of the visor 12 at the vehicle forward side relative to the opening hole 20.

A second base plate 48 in a flat plate shape is fixed inside the second casing body 44. The second base plate 48 serves as a support member. The second base plate 48 is disposed substantially perpendicularly to the up-and-down direction. A second light source 50 (for example, an LED) is supported at the lower side of the second base plate 48. To the lower side thereof, the second light source 50 faces the second emission aperture 46 of the second casing body 44 and the region of the visor 12 at the vehicle forward side relative to the opening hole 20. When the second light source 50 is lit, light may be mainly emitted to the lower side. Thus, the indicator 42 may emit the light from the second light source 50 through the second emission aperture 46 of the second casing body 44 and toward the region of the visor 12 at the vehicle forward side relative to the opening hole 20. The light emitted by the second light source 50 may be different in color from the light emitted by the first light source 40 of the illumination lamp 34.

A plate-form lens 52 (a light guide) that serves as a guide body is fixed at the lower side of the illumination lamp 34 (the first casing body 36) and the indicator 42 (the second casing body 44). The lens 52 closes off the opening hole 20 of the visor 12, the first emission aperture 38 of the first casing body 36 and the second emission aperture 46 of the second casing body 44. The lens 52 extends to the vehicle rear side of the first casing body 36 and is bent (inflected) at the vehicle rear side of the first casing body 36. The lens 52 passes through the interior of the accommodation frame 18 and a vehicle rear side end portion of the lens 52 is inserted (tightly fitted) into the light emission hole 22 of the visor 12. A vehicle front side end portion of the lens 52 is formed as a flat face-form redirection surface 52A that serves as a differentiation portion. The redirection surface 52A is angled in a direction that approaches the vehicle rear side toward the lower side thereof, and is disposed at the lower side of the second emission aperture 46 of the second casing body 44.

The lens 52 is transparent and is capable of transmitting (guiding) light.

When the illumination lamp 34 emits light from the first light source 40 through the first emission aperture 38 of the first casing body 36, the light is incident at the lens 52 through an upper side face (a plate surface) thereof, and is transmitted through the lens 52 substantially in a plate thickness direction thereof. Consequently, the light exits from a lower side face (a plate surface) of the lens 52, and passes through the opening hole 20 of the visor 12. Thus, the light is emitted to the lower side from the opening hole 20, and the ground surface below the visor 12 is illuminated.

When the indicator 42 emits light from the second light source 50 through the second emission aperture 46 of the second casing body 44, the light is incident at the lens 52 through the upper side face, is transmitted through the lens 52 substantially in the plate thickness direction thereof, and is reflected toward the vehicle rear side by the redirection surface 52A of the lens 52. The light is transmitted through the lens 52 along a transmission path substantially in a plate surface direction, being reflected by one or both of the upper side face and the lower side face of the lens 52. Consequently, the light passes through the light emission hole 22 of the visor 12 and exits from the vehicle rear side end face of the lens 52. Thus, the light is emitted from the light emission hole 22 to the vehicle rear side, toward the upper side, and the light emission hole 22 displays the lighting to the occupant 32.

As shown in FIG. 1, the illumination lamp 34 (the first light source 40) is electrically connected to a control device 54 of the vehicle, and an opening sensor 56 that serves as a first detector is electrically connected to the control device 54. The opening sensor 56 is capable of detecting the door being opened or unlocked (a lock being released). When the opening sensor 56 detects the door being opened or unlocked, the first light source 40 is lit under the control of the control device 54.

The indicator 42 (the second light source 50) is electrically connected to the control device 54, and an obstruction sensor 58 that serves as a second detector is electrically connected to the control device 54. The obstruction sensor 58 is capable of detecting an obstruction in the vicinity of the vehicle (particularly an obstruction at the lower side relative to the mirror body 26). When the obstruction sensor 58 detects an obstruction, the second light source 50 is lit (and may be flashed) under the control of the control device 54). The term "obstruction" herein refers to an obstacle to running of the vehicle, opening of the door or the like (particularly an obstacle with which the running vehicle, the opening door or the like may collide), which is an object that the occupant 32 should be aware of.

Now, operation of the present exemplary embodiment is described.

In the vehicle door mirror apparatus 10 with the structure described above, when the opening sensor 56 detects the door being opened or unlocked, the first light source 40 of the illumination lamp 34 is lit under the control of the control device 54. Accordingly, the illumination lamp 34 emits the light from the first light source 40 through the first emission aperture 38 of the first casing body 36, the light is transmitted through the lens 52 substantially in the plate thickness direction, and passes through the opening hole 20 of the visor 12. Thus, the light is emitted from the opening hole 20 to the lower side, the ground surface below the visor 12 is illuminated, and the occupant 32, who is opening the door and dismounting from the vehicle, may clearly see where they are placing their feet.

When the obstruction sensor 58 detects an obstruction in the vicinity of the vehicle, the second light source 50 of the indicator 42 is lit under the control of the control device 54. Accordingly, the indicator 42 emits the light from the second light source 50 through the second emission aperture 46 of the second casing body 44, the light is reflected toward the vehicle rear side by the redirection surface 52A of the lens 52, and the light is transmitted through the lens 52 substantially in the plate surface direction. Hence, the light passes through the light emission hole 22 of the visor 12 and is emitted to the vehicle rear side and upper side from the light emission hole 22. Thus, the light emission hole 22 displays the lighting (a warning display) to the occupant 32, and the occupant 32 may be made aware of the obstruction. In particular, when the obstruction sensor 58 detects an obstruction at the lower side relative to the mirror body 26, because the lighting is displayed by the light emission hole 22 at the lower side relative to the mirror body 26, the presence of the obstruction at the lower side relative to the mirror body 26 may be easily recognized by the occupant 32.

Here, because the light emitted by the indicator 42 (the second emission aperture 46) is reflected by the redirection surface 52A of the lens 52, the directions in which the light emitted by the illumination lamp 34 (the first emission aperture 38) and the light emitted by the indicator 42 (the second emission aperture 46) are guided by the lens 52 (the directions of transmission in the lens 52) are different.

Therefore, the light emitted by the illumination lamp 34 and the light emitted by the indicator 42 may be guided by the lens 52 to the respectively separate opening hole 20 and light emission hole 22. Thus, any requirement to provide the lens 52 separately in correspondence with the illumination lamp 34 and the indicator 42 may be eliminated, and the illumination lamp 34 and the indicator 42 may both utilize the lens 52. Therefore, a space required for mounting the lens 52 in the visor 12 may be made smaller, and the illumination lamp 34, the indicator 42 and the lens 52 may be mounted at the lower end of the interior of the visor 12 even when a space at the lower end of the interior of the visor 12 is small (particularly when the indicator 42 cannot be mounted inside the accommodation frame 18 of the visor 12, between the accommodation frame 18 and the illumination lamp 34, or the like). In addition, costs for the lens 52 may be reduced.

As described above, the light emitted by the indicator 42 is reflected by the redirection surface 52A of the lens 52. Thus, the directions in which the light emitted by the illumination lamp 34 and the light emitted by the indicator 42 are guided by the lens 52 may be made different with a simple structure.

The light emitted by the illumination lamp 34 is guided substantially in the plate thickness direction by the lens 52, and the light emitted by the indicator 42 is guided substantially in the plate surface direction by the lens 52. Thus, the directions in which the light emitted by the illumination lamp 34 and the light emitted by the indicator 42 are guided by the lens 52 may be made greatly different. Therefore, occurrences of the light emitted by the illumination lamp 34 being guided substantially in the plate surface direction of the lens 52 and emitted from the light emission hole 22 of the visor 12 may be suppressed, and occurrences of the light emitted by the indicator 42 being guided substantially in the plate thickness direction of the lens 52 and emitted from the opening hole 20 of the visor 12 may be suppressed.

The light emission direction of the illumination lamp 34 (the first emission aperture 38) is not directed at the light emission hole 22 of the visor 12, and the light emission direction of the indicator 42 (the second emission aperture 46) is not directed at the opening hole 20 of the visor 12. Therefore, occurrences of the light emitted by the illumination lamp 34 being emitted from the light emission hole 22 of the visor 12 may be further suppressed, and occurrences of the light emitted by the indicator 42 being emitted from the opening hole 20 of the visor 12 may be further suppressed.

Second Exemplary Embodiment

FIG. 3A is a sectional diagram in which a vehicle door mirror apparatus 70 in accordance with a second exemplary embodiment, in which the door mirror apparatus for a vehicle of the present invention is employed, is viewed in the vehicle width direction.

The vehicle door mirror apparatus 70 according to the present exemplary embodiment has substantially the same structure as the first exemplary embodiment described above but differs in the following respects.

As shown in FIG. 3A, in the vehicle door mirror apparatus 70 according to the present exemplary embodiment, the first casing body 36 of the illumination lamp 34 and the second casing body 44 of the indicator 42 are made integral, and a casing body 72 with a substantially hemispherical container shape is structured to serve as a reflecting body. An inner face of the casing body 72 is made capable of reflecting light. An emission aperture 74 is formed in a lower side face of the casing body 72. Thus, the lower side face of the casing body 72 is open. The emission aperture 74 faces the opening hole 20 of the visor 12 and a region of the visor 12 at the vehicle front side relative to the opening hole 20.

The first base plate (not shown in the drawing) and the second base plate 48 are fixed inside the casing body 72. The first base plate and the second base plate 48 are disposed substantially perpendicularly to the up-and-down direction. The first light source 40 (for example, a lamp) and the second light source 50 (for example, an LED) are supported at the lower side of the first base plate and the lower side of the second base plate 48, respectively. To the lower side, the first light source 40 faces the emission aperture 74 of the casing body 72 and the opening hole 20 of the visor 12. To the lower side, the second light source 50 faces the emission aperture 74 of the casing body 72 and the region of the visor 12 at the vehicle front side relative to the opening hole 20.

When the first light source 40 is lit, the light thereof may be mainly emitted to the lower side, and the illumination lamp 34 may emit the light from the first light source 40 through the emission aperture 74 of the casing body 72 and toward the opening hole 20 of the visor 12. When the second light source 50 is lit, the light thereof may be mainly emitted to the lower side, and the indicator 42 may emit the light from the second light source 50 through the emission aperture 74 of the casing body 72 and toward the region of the visor 12 at the vehicle front side relative to the opening hole 20.

The lens 52 is fixed at the lower side of the illumination lamp 34 and the indicator 42 (the lower side of the casing body 72). The lens 52 closes off the opening hole 20 of the visor 12 and the emission aperture 74 of the casing body 72. An indentation portion 76 with a triangular shape in cross section is formed in the lower side face of the lens 52. A vehicle rear side face of the indentation portion 76 is formed as the redirection surface 52A, is angled in the direction that approaches the vehicle rear side toward the lower side thereof, and is disposed at the lower side of the second light source 50 of the indicator 42.

When the illumination lamp 34 emits the light from the first light source 40 through the emission aperture 74 of the casing body 72, the light is incident on the lens 52 through the upper side face thereof, and is transmitted through the lens 52 substantially in the plate thickness direction. Consequently, the light exits through the lower side face of the lens 52 and passes through the opening hole 20 of the visor 12. Thus, the light is emitted through the opening hole 20 to the lower side and illuminates the ground surface below the visor 12.

When the indicator 42 emits the light from the second light source 50 through the emission aperture 74 of the casing body 72, the light is incident on the lens 52 through the upper side face thereof, is transmitted through the lens 52 substantially in the plate thickness direction, and is reflected toward the vehicle rear side by the redirection surface 52A of the lens 52. The light is transmitted through the lens 52 along a transmission path substantially in the plate surface direction, being reflected by one or both of the upper side face and the lower side face of the lens 52. Consequently, the light passes through the light emission hole 22 of the visor 12 and is emitted from the vehicle rear side end face of the lens 52. Thus, the light exits from the light emission hole 22 to the vehicle rear side, toward the upper side, and the light emission hole 22 displays the lighting to the occupant 32.

In the present exemplary embodiment too, the same operations and effects as in the first exemplary embodiment described above are realized.

In addition, the illumination lamp 34 and the indicator 42 both utilize the casing body 72. Therefore, the space required for mounting of the casing body 72 in the visor 12 may be made smaller, and even when the space at the lower end of the interior of the visor 12 is small, the illumination lamp 34, the indicator 42 and the lens 52 may be mounted at the lower end of the interior of the visor 12. Moreover, costs for the casing body 72 may be reduced.

Third Exemplary Embodiment

FIG. 3B is a sectional diagram in which a vehicle door mirror apparatus 80 in accordance with a third exemplary embodiment, in which the door mirror apparatus for a vehicle of the present invention is employed, is viewed in the vehicle width direction.

The vehicle door mirror apparatus 80 according to the present exemplary embodiment has substantially the same structure as the second exemplary embodiment described above but differs in the following respects.

As shown in FIG. 3B, in the vehicle door mirror apparatus 80 according to the present exemplary embodiment, the first base plate of the illumination lamp 34 and the second base plate 48 of the indicator 42 are made integral, structuring a flat plate-shaped base plate 82 that serves as a support member. The base plate 82 is fixed inside the casing body 72. The base plate 82 is disposed substantially perpendicularly to the up-and-down direction. The first light source 40 (for example, a lamp) and the second light source 50 (for example, an LED) are supported at the lower side of the base plate 82. The base plate 82 has a light-blocking property.

In the present exemplary embodiment too, the same operations and effects as in the second exemplary embodiment described above are realized.

In addition, the illumination lamp 34 and the indicator 42 both utilize the base plate 82. Therefore, the base plate 82 may be reduced in size and costs for the base plate 82 may be reduced.

Fourth Exemplary Embodiment

Figure 4A:
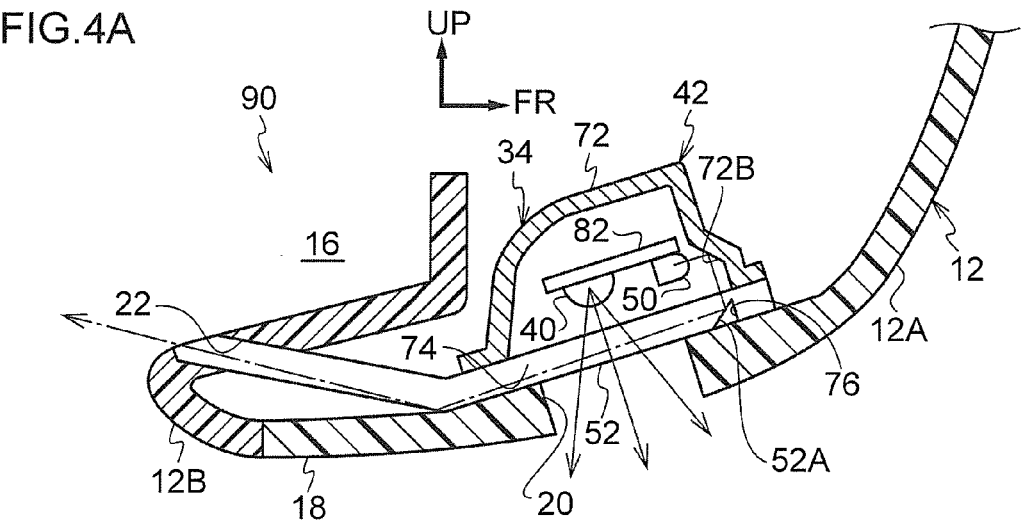
FIG. 4A is a sectional diagram, viewed in the vehicle width direction, showing principal portions of a door mirror apparatus for a vehicle in accordance with a fourth exemplary embodiment of the present invention.

FIG. 4A is a sectional diagram in which a vehicle door mirror apparatus 90 in accordance with a fourth exemplary embodiment, in which the door mirror apparatus for a vehicle of the present invention is employed, is viewed in the vehicle width direction.

The vehicle door mirror apparatus 90 according to the present exemplary embodiment has substantially the same structure as the third exemplary embodiment described above but differs in the following respects.

As shown in FIG. 4A, in the vehicle door mirror apparatus 90 according to the present exemplary embodiment, a flat face-form second reflection surface 72B is formed at a vehicle front side end portion of the inner face of the casing body 72. The second reflection surface 72B is angled in a direction that approaches the lower side toward the vehicle front side. The second reflection surface 72B is disposed at the vehicle front side of the second light source 50 of the indicator 42, and the region of the visor 12 at the vehicle front side relative to the opening hole 20 is disposed at the lower side of the second reflection surface 72B.

When the second light source 50 of the indicator 42 is lit, the light may be mainly emitted to the vehicle front side thereof. The light from the second light source 50 is reflected to the lower side by the second reflection surface 72B of the casing body 72. Thus, the indicator 42 may emit the light from the second light source 50 through the emission aperture 74 of the casing body 72 and toward the region of the visor 12 at the vehicle front side relative to the opening hole 20.

The redirection surface 52A of the lens 52 is disposed below the second reflection surface 72B of the casing body 72. Therefore, when the indicator 42 emits the light from the second light source 50 through the emission aperture 74 of the casing body 72, the light is incident on the lens 52 through the upper side face thereof, is transmitted through the lens 52 substantially in the plate thickness direction, and is reflected toward the vehicle rear side by the redirection surface 52A of the lens 52. Thus, the light is transmitted through the lens 52 along a transmission path substantially in the plate surface direction, being reflected by one or both of the upper side face and the lower side face of the lens 52. Consequently, the light passes through the light emission hole 22 of the visor 12 and is emitted from the vehicle rear side end face of the lens 52. Thus, the light exits from the light emission hole 22 to the vehicle rear side, toward the upper side, and the light emission hole 22 displays the lighting to the occupant 32.

In the present exemplary embodiment too, the same operations and effects as in the third exemplary embodiment described above are realized.

In addition, the light emitted from the second light source 50 of the indicator 42 is reflected toward the redirection surface 52A of the lens 52 by the second reflection surface 72B of the casing body 72. Therefore, the light emitted from the second light source 50 may be effectively delivered to the redirection surface 52A by the second reflection surface 72B, and losses of the light emitted from the second light source 50 may be suppressed. Thus, the light emission hole 22 of the visor 12 may display the lighting to the occupant 32 effectively.

Fifth Exemplary Embodiment

Figure 4B:
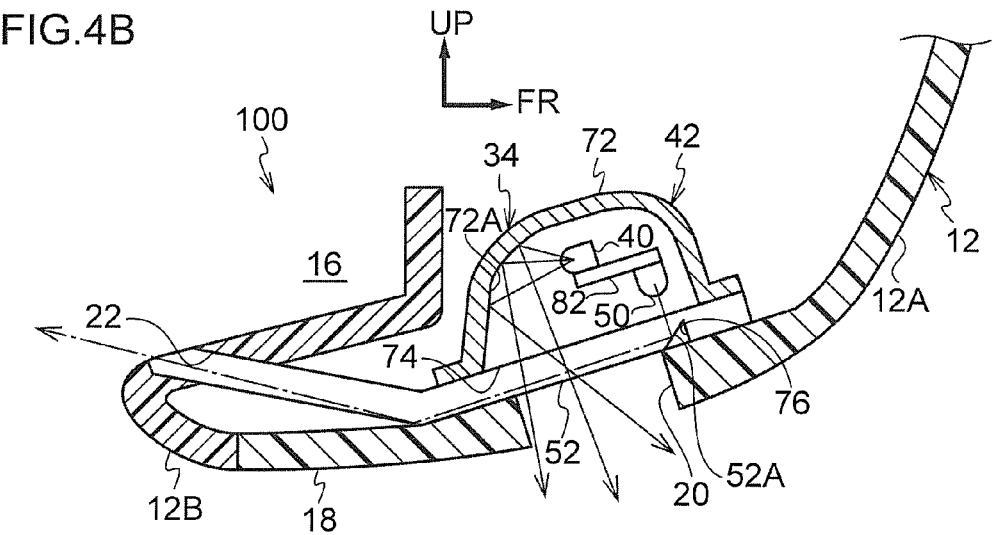
FIG. 4B is a sectional diagram, viewed in the vehicle width direction, showing principal portions of a door mirror apparatus for a vehicle in accordance with a fifth exemplary embodiment of the present invention.

FIG. 4B is a sectional diagram in which a vehicle door mirror apparatus 100 in accordance with a fifth exemplary embodiment, in which the door mirror apparatus for a vehicle of the present invention is employed, is viewed in the vehicle width direction.

The vehicle door mirror apparatus 100 according to the present exemplary embodiment has substantially the same structure as the third exemplary embodiment described above but differs in the following respects.

As shown in FIG. 4B, in the vehicle door mirror apparatus 100 according to the present exemplary embodiment, a curved face-form first reflection surface 72A is formed at a vehicle rear side region of the inner face of the casing body 72. The first reflection surface 72A is curved in a substantially spherical surface shape.

The first light source 40 of the illumination lamp 34 is supported at the upper side of the base plate 82 inside the casing body 72. When the first light source 40 is lit, the light may be mainly emitted to the vehicle rear side thereof. The light from the first light source 40 is reflected to the lower side by the first reflection surface 72A of the casing body 72. Thus, the illumination lamp 34 may emit the light from the first light source 40 through the emission aperture 74 of the casing body 72 and toward the opening hole 20 of the visor 12.

When the illumination lamp 34 emits the light from the first light source 40 through the emission aperture 74 of the casing body 72, the light is incident on the lens 52 through the upper side face thereof, and is transmitted through the lens 52 substantially in the plate thickness direction. Consequently, the light is emitted through the lower side face of the lens 52 and passes through the opening hole 20 of the visor 12. Thus, the light exits through the opening hole 20 to the lower side and illuminates the ground surface below the visor 12.

In the present exemplary embodiment too, the same operations and effects as in the third exemplary embodiment described above are realized.

In addition, because the light emitted from the first light source 40 of the illumination lamp 34 is reflected toward the opening hole 20 of the visor 12 by the first reflection surface 72A of the casing body 72, the light emitted from the first light source 40 may be effectively delivered to the opening hole 20 by the first reflection surface 72A, and losses of the light emitted from the first light source 40 may be suppressed. Thus, the ground surface below the visor 12 may be effectively illuminated.

Sixth Exemplary Embodiment

Figure 4C:
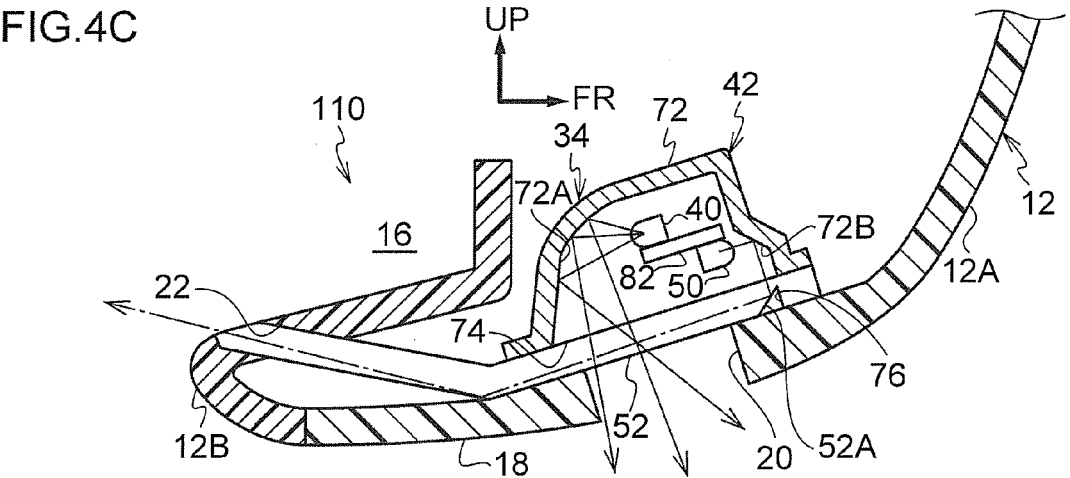
FIG. 4C is a sectional diagram, viewed in the vehicle width direction, showing principal portions of a door mirror apparatus for a vehicle in accordance with a sixth exemplary embodiment of the present invention.

FIG. 4C is a sectional diagram in which a vehicle door mirror apparatus 110 in accordance with a sixth exemplary embodiment, in which the door mirror apparatus for a vehicle of the present invention is employed, is viewed in the vehicle width direction.

The vehicle door mirror apparatus 110 according to the present exemplary embodiment has substantially the same structure as the third exemplary embodiment described above but differs in the following respects.

As shown in FIG. 4C, in the vehicle door mirror apparatus 110 according to the present exemplary embodiment, similarly to the fourth exemplary embodiment described above, the second reflection surface 72B is formed at the vehicle front side end portion of the inner face of the casing body 72. When the second light source 50 of the indicator 42 is lit, the light may be mainly emitted to the vehicle front side thereof.

Further, similarly to the fifth exemplary embodiment described above, the first reflection surface 72A is formed at the vehicle rear side region of the inner face of the casing body 72, the first light source 40 of the illumination lamp 34 is supported at the upper side of the base plate 82 inside the casing body 72, and when the first light source 40 is lit, the light may be mainly emitted to the vehicle rear side thereof.

In the present exemplary embodiment too, the same operations and effects as in the fourth exemplary embodiment and fifth exemplary embodiment described above are realized.

Seventh Exemplary Embodiment

Figure 5A:
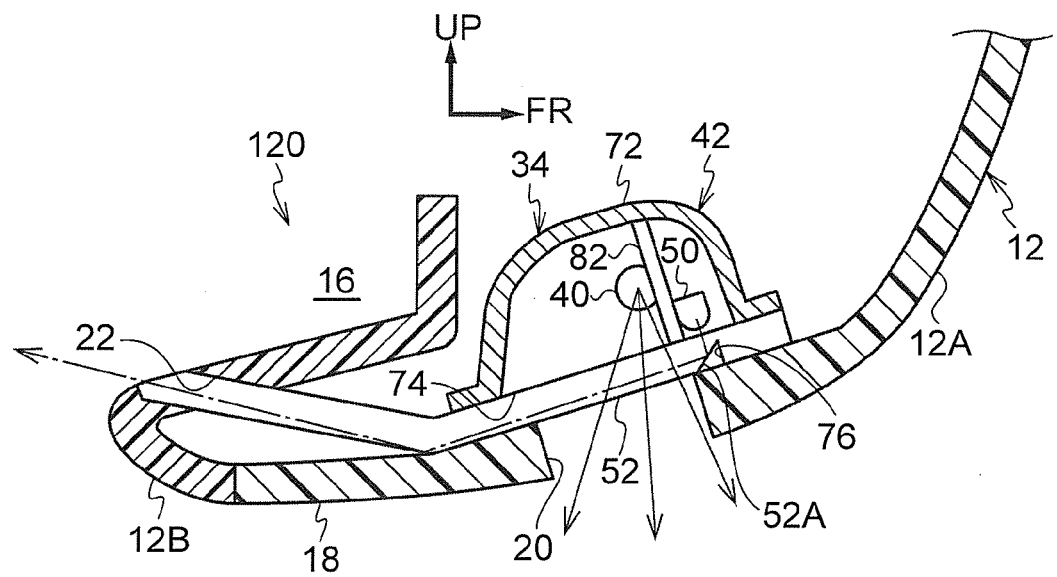
FIG. 5A is a sectional diagram, viewed in the vehicle width direction, showing principal portions of a door mirror apparatus for a vehicle in accordance with a seventh exemplary embodiment of the present invention.

FIG. 5A is a sectional diagram in which a vehicle door mirror apparatus 120 in accordance with a seventh exemplary embodiment, in which the door mirror apparatus for a vehicle of the present invention is employed, is viewed in the vehicle width direction.

The vehicle door mirror apparatus 120 according to the present exemplary embodiment has substantially the same structure as the third exemplary embodiment described above but differs in the following respects.

As shown in FIG. 5A, in the vehicle door mirror apparatus 120 according to the present exemplary embodiment, the base plate 82 inside the casing body 72 is disposed substantially perpendicularly to the vehicle front-and-rear direction. The base plate 82 functions as a dividing body, dividing the interior of the casing body 72 between a vehicle rear side region and a vehicle front side region. The first light source 40 of the illumination lamp 34 is supported at the vehicle rear side of the base plate 82, and the second light source 50 of the indicator 42 is supported at the vehicle front side of the base plate 82.

In the present exemplary embodiment too, the same operations and effects as in the third exemplary embodiment described above are realized.

The interior of the casing body 72 is divided by the base plate 82 into the vehicle rear side region at the side at which the illumination lamp 34 (the first light source 40) is disposed and the vehicle front side region at the side at which the indicator 42 (the second light source 50) is disposed. Thus, the base plate 82 divides apart incidence regions into the lens 52 of the light emitted by the illumination lamp 34 and the light emitted by the indicator 42.

Therefore, leakages of the light emitted from the first light source 40 of the illumination lamp 34 into the lens 52 at the vehicle front side relative to the base plate 82 are suppressed. Consequently, occurrences of the light emitted from the first light source 40 being reflected to the vehicle rear side by the redirection surface 52A of the lens 52, transmitted through the lens 52 substantially in the plate surface direction, and hence exiting from the light emission hole 22 of the visor 12 may be effectively suppressed.

Meanwhile, leakages of the light emitted from the second light source 50 of the indicator 42 into the lens 52 at the vehicle rear side relative to the base plate 82 are also suppressed. Consequently, occurrences of the light emitted from the second light source 50 being transmitted through the lens 52 substantially in the plate thickness direction and exiting from the opening hole 20 of the visor 12 may be effectively suppressed.

In addition, the base plate 82 that supports the first light source 40 and the second light source 50 divides apart the incidence regions into the lens 52 of the light emitted from the illumination lamp 34 and the light emitted from the indicator 42. Therefore, structure may be simplified.

Eighth Exemplary Embodiment

Figure 5B:
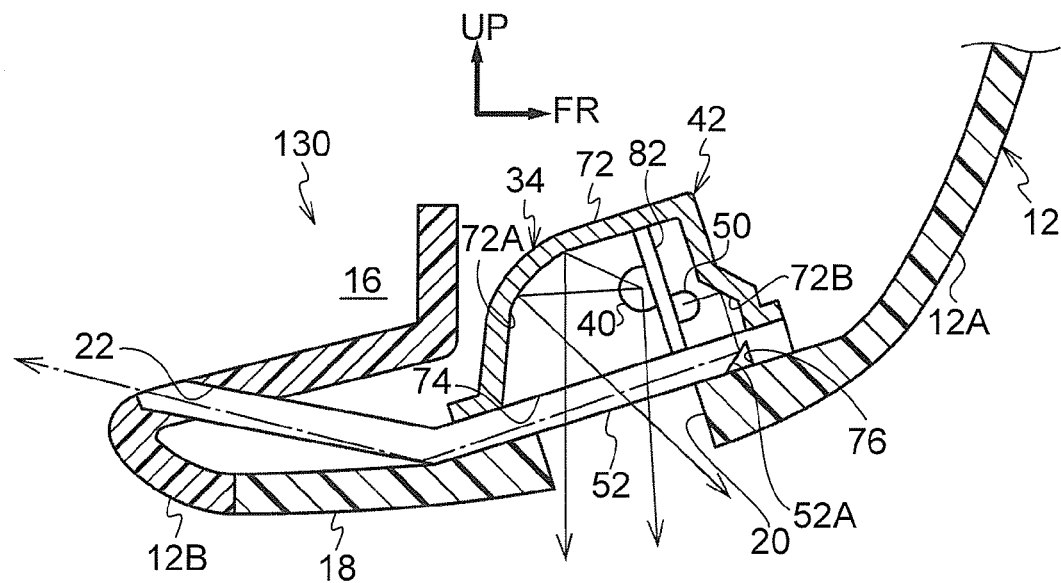
FIG. 5B is a sectional diagram, viewed in the vehicle width direction, showing principal portions of a door mirror apparatus for a vehicle in accordance with an eighth exemplary embodiment of the present invention.

FIG. 5B is a sectional diagram in which a vehicle door mirror apparatus 130 in accordance with an eighth exemplary embodiment, in which the door mirror apparatus for a vehicle of the present invention is employed, is viewed in the vehicle width direction.

The vehicle door mirror apparatus 130 according to the present exemplary embodiment has substantially the same structure as the seventh exemplary embodiment described above but differs in the following respects.

As shown in FIG. 5B, in the vehicle door mirror apparatus 130 according to the present exemplary embodiment, similarly to the sixth exemplary embodiment described above, the second reflection surface 72B is formed at the vehicle front side end portion of the inner face of the casing body 72, and when the second light source 50 of the indicator 42 is lit, the light may be mainly emitted to the vehicle front side thereof.

Further, similarly to the sixth exemplary embodiment described above, the first reflection surface 72A is formed at the vehicle rear side region of the inner face of the casing body 72 relative to the base plate 82, and when the first light source 40 of the illumination lamp 34 is lit, the light may be mainly emitted to the vehicle rear side thereof.

In the present exemplary embodiment too, the same operations and effects as in the sixth exemplary embodiment and seventh exemplary embodiment described above are realized.

In the first to eighth exemplary embodiments described above, the redirection surface 52A is formed at the lens 52 to serve as the differentiation portion of the present invention. However, the differentiation portion of the present invention may be a portion that causes a light emission direction of the indicator 42 (for example, the second emission aperture 46) to face the vehicle front side of a vehicle front side end face of the lens 52. In this case, the light from the second light source 50 of the indicator 42 is incident through the vehicle front side end face of the lens 52, and is transmitted through the lens 52 along a transmission path substantially in the plate surface direction, being reflected by one or both of the upper side face and the lower side face of the lens 52.

In the first to eighth exemplary embodiments described above, the illumination lamp 34 is used for a floor lamp and the indicator 42 is used for an obstruction warning display (reporting the presence of an obstruction). However, one or both of the illumination lamp 34 and the indicator 42 may be used for, for example, a turning indicator lamp, a "BSM" (blind spot monitoring) system or the like.

In the first to eighth exemplary embodiments described above, the indicator 42 is disposed at the vehicle front side of the illumination lamp 34. However, if there is sufficient space for mounting the indicator 42 inside the accommodation frame 18 of the visor 12, between the accommodation frame 18 and the illumination lamp 34, or the like, the indicator 42 may be disposed at the vehicle rear side of the illumination lamp 34.

In the first to eighth exemplary embodiments described above, the opening hole 20, the light emission hole 22, the illumination lamp 34, the indicator 42 and the lens 52 are provided at the visor 12. However, any of the opening hole 20, the light emission hole 22, the illumination lamp 34, the indicator 42 and the lens 52 may be provided at the stay or at the mirror body 26.

In the first to eighth exemplary embodiments described above, the present invention is applied to the vehicle door mirror apparatuses 10, 70, 80, 90, 100, 110, 120 and 130. However, the present invention may be applied to other mirror apparatuses outside and inside vehicles.

What is claimed is:

1. A mirror apparatus for a vehicle, comprising:
   a design body that includes a mirror provided at a vehicle, the design body structuring a design surface;
   a first emission member that emits light;
   a second emission member that emits light;
   a guide body that guides light emitted by the first emission member and light emitted by the second emission member to an outer side of the design body; and
   a differentiation portion that makes directions in which the light emitted by the first emission member and the light emitted by the second emission member are guided by the guide body different,
   wherein the guide body guides the light emitted by the first emission member substantially in a plate thickness direction so as to pass through the guide body, and guides the light emitted by the second emission member substantially in a plate surface direction.

2. The mirror apparatus for a vehicle according to claim 1, wherein the differentiation portion reflects the light emitted by one of the first emission member or the second emission member.

3. The mirror apparatus for a vehicle according to claim 1, further comprising a dividing body disposed between the first emission member and the second emission member, the dividing body dividing apart incidence regions into the guide body of the light emitted by the first emission member and the light emitted by the second emission member.

4. The mirror apparatus for a vehicle according to claim 1, wherein the guide body includes a plate-form lens, and the differentiation portion includes a redirection surface that is formed at an end portion of the lens, and the light emitted by the second emission member being reflected by the redirection surface to be guided in a plate surface direction.

5. The mirror apparatus for a vehicle according to claim 1, wherein the guide body includes a plate-form lens, and the differentiation portion includes a redirection surface that is formed at an indentation portion of the lens, the indentation portion being formed with a triangular shape in cross section, and the light emitted by the second emission member being reflected by the redirection surface to be guided in a plate surface direction.

6. The mirror apparatus for a vehicle according to claim 1, further comprising a support member that supports the first emission member and the second emission member; and a casing body that fixes the support member inside the casing body.

7. The mirror apparatus for a vehicle according to claim 6, wherein a first reflection surface is formed in a curved face-form at an inner face of the casing body, and the light emitted by the first emission member is reflected by the first reflection surface.

8. The mirror apparatus for a vehicle according to claim 6, wherein a second reflection surface is formed in a flat face-form at an inner face of the casing body, and the light emitted by the second emission member is reflected by the second reflection surface.

9. A mirror apparatus for a vehicle according to claim 1, wherein the design body includes an opening over the guide body, and the guide body guides the light emitted by the first emission member substantially in a plate thickness direction so as to pass through the guide body and through the opening in the design body.

10. A mirror apparatus for a vehicle according to claim 1, wherein a substantial portion of the light emitted by the first emission member impinges substantially orthogonally on the guide body in a plate thickness direction so as to be transmitted completely through the guide body.

* * * * *